March 21, 1961 B. D. LOUGHLIN 2,976,351
COLOR-SIGNAL MODIFYING APPARATUS
Original Filed Feb. 26, 1953
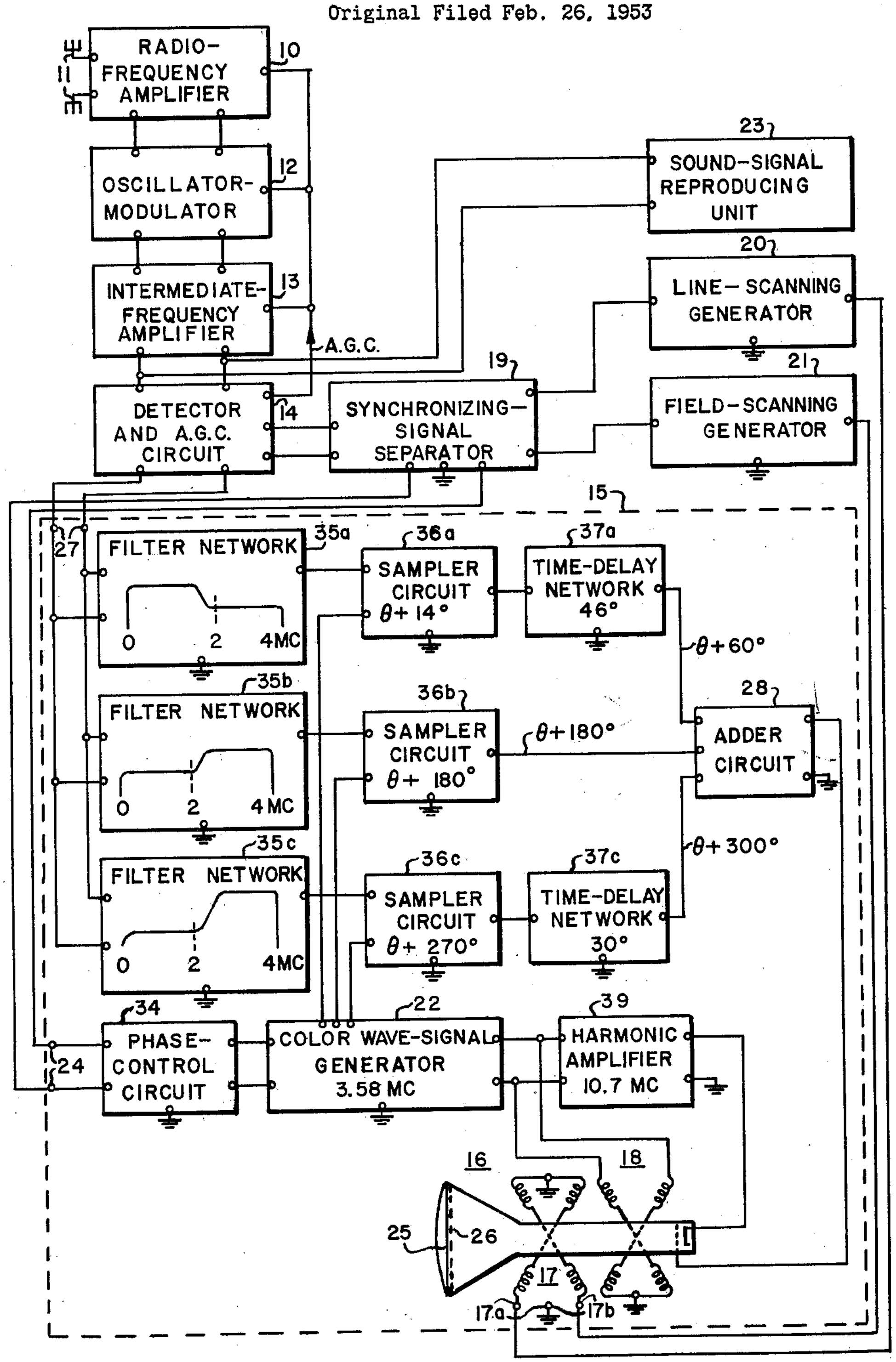

2,976,351

COLOR-SIGNAL MODIFYING APPARATUS

Bernard D. Loughlin, Huntington, N.Y., assignor to Hazeltine Research, Inc., Chicago, Ill., a corporation of Illinois

Original application Feb. 26, 1953, Ser. No. 339,145. Divided and this application Aug. 12, 1958, Ser. No. 754,602

4 Claims. (Cl. 178—5.4)

*General*

The present invention relates in general to signal-modifying apparatus, and particularly, though not limited thereto, to signal-modifying apparatus in color-television receivers for utilizing an NTSC type of color-television signal for modifying the relative phases and intensities of the modulation components of the received subcarrier wave signal. This application is a divisional application from copending application Serial No. 339,145, filed February 26, 1953, and entitled "Color-Television Receiver."

An NTSC type of color-television signal has a monochrome signal which includes the luminance information and a subcarrier wave signal which includes the chrominance information of a televised color image. When such signals are utilized in the proper manner in a color-television receiver, for example, when the monochrome signal is translated through one channel to contribute luminance and the modulation components of the subcarrier wave signal are derived in another channel to contribute solely chromaticity, as occurs when a shadow-mask, three-gun color-television tube is employed, the benefits of constant luminance such as described in detail in applicant's United States Patent No. 2,773,929, entitled "Constant Luminance Color-Television System," are obtained. Use of such a three-gun image-reproducing tube permits both derivation of the signals representative of the three primary colors and proper relative proportioning of the intensities thereof prior to their being applied to such guns. Such control of the modulation components of the subcarrier wave signal, in the form of derived signals, assures that these signals will provide only the chromaticity in the reproduced image and will not affect luminance.

In an article entitled "General Description of Receivers for the Dot-Sequential Color-Television System Which Employ Direct-View Tri-Color Kinescopes," in the June 1950 issue of the RCA Review at pages 228–232, inclusive, there is described a color image-reproducing tube having a single electron gun, and therefore, a single electron beam so arranged as to produce a color image from three primary colors. It is proposed that a tube of this type be utilized in a color-television receiver in such manner that a composite video-frequency signal such as described above and having both monochrome-signal components representative of the luminance of an image and a modulated subcarrier wave signal including modulation components representative of the chromaticity thereof be applied to a control electrode of the tube. The separation from each other of the color-signal components relating to the primary colors then occurs as the electron beam in the tube travels from the control electrode thereof to the image screen thereof. To effect the latter result, the image screen of the tube is composed of an orderly array of small, closely spaced dots or elemental areas arranged in substatnially triangular groups, each group comprising a dot for developing green, a dot for developing red, and a dot for developing blue. A mask having apertures suitably located with respect to the dots is positioned between the screen and the electron gun. A magnetic field, rotating at the frequency of the color wave signal, is developed around the neck of the tube at a point between the control electrode and the image screen thereof and causes the electron beam continuously to rotate in a tight helix at the frequency of the color wave signal. By proper phasing of the rotational field with relation to the phase of the composite video-frequency signal applied to the control electrode of the cathode-ray tube, at any instant the electron beam can be caused to pass through the mask at such an angle as to fall at that instant upon a dot for developing any selected one of the three colors. At the instant when the beam is directed at one dot on the screen, the color signal corresponding to that dot and which is a component of the composite video-frequency signal is applied to the control electrode of the tube effectively as a pulse and, in this way, intensity-modulates the dot to develop the proper color.

If a composite video-frequency signal of the NTSC type such as described with respect to the three-gun picture tube is applied to the control electrode of a single-gun tube of the type just considered, the image reproduced therein does not faithfully reproduce the colors of the televised image. This lack of fidelity results from the fact that such a composite video-frequency signal is purposely developed at the transmitter to have the components thereof in particular phase and intensity relationship to assure that the monochrome signal provides the luminance information while the chrominance or subcarrier wave signal provides the chrominance information and does not disturb luminance. Particularly, at the transmitter the modulation components of the subcarrier wave signal are controlled in relative intensity and in the phases at which they modulate the subcarrier wave signal so that the relative proportions of these components may be varied at the receiver to produce constant luminance in the reproduced image. The operation of a single-gun color tube of the type discused above is normally symmetrical when deriving the signals representative of the different primary colors, that is, the derived signals are taken from equally spaced phases of the subcarrier wave signal with uniform gain or attenuation. Consequently, the resultant image lacks color fidelity and the chrominance signal tends to disturb the luminance thereof. To minimize these undesirable effects, it is desirable that the composite video-frequency signal be modified prior to application to the picture tube. The monochrome component thereof should be precompensated to effect cancellation of the luminance disturbances which the derived color signals tend to cause, and the relative phasing and intensities of the modulation components of the subcarrier wave signal should be modified to assure that they may be properly derived by a symmetrical system faithfully to reproduce the televised colors.

The application of which this is a division describes apparatus for modifying the monochrome and subcarrier wave signals to accomplish the above-mentioned results. In such application, circuits for effecting modification of the modulation components of the subcarrier wave signal are described. In one of these circuits the modulation components are initially derived from the received subcarrier wave signal, are individually modified, and are then employed to modulate another subcarrier wave signal at symmetrically disposed phases. In addition, such application describes signal-modifying apparatus for correcting the relative phasing and intensities of the modulation components of the received subcarrier wave signal without deriving such components from the subcarrier wave signal. In other words, apparatus is described for modifying the received subcarrier wave signal directly into a resultant subcarrier wave signal suitable for use in a one-gun picture tube of the type previously mentioned herein. The present application is directed specifically to the first-mentioned signal-modifying apparatus.

It is an object of the present invention, therefore, to provide for a color-television receiver a new and improved signal-translating system which avoids the aforementioned limitation of the prior signal-translating system.

It is a further object of the present invention to provide for a color-television receiver which includes a single-gun color image-reproducing tube for symmetrical color signal demodulation, a signal-translating system which develops from an NTSC type of color-television signal a composite video-frequency signal having symmetrical modulation components for application to such tube.

In accordance with the present invention, a color-signal modifying apparatus comprises means for supplying a color-television signal having modulation components asymmetrically disposed thereon, a plurality of signal-translating means coupled to the supply means having nonuniform amplitude response characteristics, each of the translating means including a sampling circuit, and at least one of the translating means having a predetermined phase shift, for developing from the supplied signal symmetrically phased signal components of a luminance-corrected symmetrical signal. The color signal modifying apparatus also comprises signal combining means coupled to the output of the translating means for combining the symmetrically phased luminance-corrected components into a composite luminance-corrected signal.

For a better understanding of the present invention, together with other and further objects thereof, reference is had to the following description taken in connection with the accompanying drawing, and its scope will be pointed out in the appended claims.

Referring to the single figure of the drawing, there is shown a schematic diagram of a color-television receiver embodying color-signal modifying apparatus in accordance with a preferred form of the present invention.

*General description of color-television receiver*

Referring to the drawing, there is represented a color-television receiver embodying color-signal modifying apparatus in accordance with the present invention. This receiver includes a radio-frequency amplifier 10 of any desired number of stages having its input circuit connected to an antenna system 11, 11. Coupled in cascade with the output circuit of the amplifier 10, in the order named, are an oscillator-modulator 12, an intermediate-frequency amplifier 13 of one or more stages, a composite video-frequency signal detector and automatic-gain-control (AGC) circuit 14, and color-signal modifying apparatus 15 comprising a plurality of signal-translating networks, an adder circuit, and a color image-reproducing apparatus 16, all of which are to be described in more detail hereinafter. Generally, the system 15 comprises means for developing from the composite video-frequency signal applied thereto a modified composite video-frequency signal suitable for application to the reproducing apparatus 16 therein. The color image-reproducing apparatus 16 is, for example, of a so-called single electron-gun type as described in the RCA Review article previously referred to and includes conventional beam-deflecting windings 17 as well as auxiliary deflection windings 18, an apertured mask, and an image screen which will be discussed in more detail hereinafter. There is also coupled to the detector 14 a synchronizing-signal separator 19 having output circuits connected through a line-scanning generator 20 and a field-scanning generator 21, respectively, to line-deflection and field-deflection portions of the beam-deflecting windings 17 in the image-reproducing apparatus 16. Another output circuit of the separator 19 is also connected through a pair of terminals 24, 24 and a phase-control circuit 34 to a color wave-signal generator 22, both units 22 and 34 being components of the system 15 and will be described more fully hereinafter.

The output circuit of the AGC supply included in the unit 14 is connected to the input circuits of one or more of the tubes of the radio-frequency amplifier 10, the oscillator-modulator 12, and the intermediate-frequency amplifier 13 in a well-known manner. A sound-signal reproducing unit 23 is also connected to an output circuit of the intermediate-frequency amplifier 13 and may include one or more stages of intermediate-frequency amplification, a sound-signal detector, one or more stages of audio-frequency amplification, and a sound-reproducing device.

It will be understood that the various units thus far described, with the exception of the system 15 and its circuit components including the image-reproducing apparatus 16, may have any conventional construction and design, the details of which are well known in the art, rendering a further description thereof unnecessary.

*General operation of color-television receiver*

Considering briefly the operation of the receiver as a whole, it is assumed for the moment that the unit 15 includes a conventional color signal-detection unit as generally described in the application referred to above and that the image-reproducing apparatus 16 of the unit 15 is a conventional apparatus for reproducing color images, for example, including three cathode-ray tubes and a dichroic mirror system. A desired modulated color-television wave signal is intercepted by the antenna system 11, 11. The signal is selected and amplified in the radio-frequency amplifier 10 and applied to the oscillator-modulator 12, wherein it is converted into an intermediate-frequency signal. The intermediate-frequency signal is then selectively amplified in the amplifier 13 and applied to the detector 14, wherein its modulation components including the above-mentioned composite video-frequency signal, are derived. The composite video-frequency signal is applied to the unit 15 through which the color-signal components and the monochrome components are translated, in a manner to be explained more fully hereinafter, for application to the color image-reproducing apparatus 16, also in a manner to be described more fully hereinafter. The signals applied to the unit 16 modulate the intensity of the electron beam therein in a predetermined manner to be considered more fully hereinafter.

The synchronizing-signal components of the signal derived in the detector 14 are separated from the video-frequency components in the separator 19 and are used to synchronize the operation of the line-scanning and field-scanning generators 20 and 21, respectively. These generators supply signals of saw-tooth wave form which are properly synchronized with reference to the transmitted television signal and which are applied to the deflecting windings 17 of the cathode-ray tube in the unit 16 thereby to deflect the cathode-ray beam of the tube in two directions normal to each other. The beam deflection, together with the modulation of the intensity of the electron beam, effect on the screen of the tube a reproduction of the color image being televised at the transmitter. Synchronizing signals derived in the unit 19 are also applied through the terminals 24, 24 to the color wave-signal generator 22 to synchronize the operation of the latter unit with a similar unit in the transmitter for purposes to be described more fully hereinafter.

The automatic-gain-control or AGC signal derived in the unit 14 is effective to control the amplification of one or more of the units 10, 12, and 13 to maintain the signal input to the detector 14 and to the sound-signal reproducing unit 23 within a relatively narrow range for a wide range of received signal intensities.

The sound-signal modulated wave signal accompanying the desired television wave signal is also intercepted by the antenna system 11, 11 and, after amplification in the amplifier 10 and conversion to an intermediate-frequency signal in the unit 12, it is translated through the amplifier 13 to the sound-signal reproducing unit 23. In the unit 23 it is amplified, the sound-signal modulation components are derived therefrom, and the latter components are further amplified and utilized to reproduce the sound by application to the reproducing device in the unit 23 in a conventional manner.

*Description of color-signal modifying apparatus 15*

The color-signal modifying apparatus 15 includes a plurality of signal-translating channels comprising filter networks **35*a*–35*c*, inclusive, coupled in parallel to the input terminals 27, 27. The filter networks 35*a*–35*c*, inclusive, preferably have 0–4 megacycle pass bands and are proportioned to have nonuniform attenuation characteristics, the nonuniformity being determined by the composition of the composite video-frequency signal applied to the unit 15, more specifically being determined by the reciprocal of the gain factors $h$, $1/n$, and $1/p$, considered in more detail hereinafter. For example, these factors are, respectively, 2, 1/1.12, and 1/2.75 for a given set of primary colors. The network 35*a*, in the embodiment described herein, is proportioned to translate signals of lower frequencies, specifically of 0–2 megacycles, with negligible attenuation while the signals having a frequency range of 2–4 megacycles and including the modulated subcarrier wave signal are translated therethrough with a much higher attenuation, the difference in attenuation being of the order of 6 db or the reciprocal of the gain factor 2. The filter network 35*b* is proportioned to translate the 0–2 megacycle signals with more attenuation than the modulated subcarrier wave signal in the frequency of 2–4 megacycles, for example, the difference in attenuation being of the order of 1 db or the reciprocal of the gain factor 1/1.12. The filter network 35*c*** is proportioned to translate the modulated subcarrier wave signal with less attenuation than the lower frequency 0–2 megacycle signals, the difference in attenuation being of the order of 9 db or the reciprocal of the gain factor 1/2.75.

Coupled to the outputs of filter networks **35*a*, 35*b*, and 35*c* are sampler circuits 36*a*, 36*b*, and 36*c*, respectively. These circuits effectively are high-speed gating circuits for individually translating gated portions or pulses of the modulated subcarrier wave signal and of the 0–2 megacycle low-frequency monochrome components. The sampler circuits 36*a*–36*c*, inclusive, also have coupled to input circuits thereof individual ones of the output circuits of the generator 22. The output circuit of the unit 22 coupled to the sampler 36*a* is proportioned to delay the phase of the signal developed in the generator with respect to a reference phase $\theta$ of the subcarrier wave signal by approximately 14°. Similarly, the output circuits of the unit 22 coupled to the sampler circuits 36*b* and 36*c*** are proportioned to delay the generated signal by phase angles of 180° and 270°, respectively, with respect to the reference phase $\theta$.

The outputs of sampling circuits **36*a* and 36*c* are coupled to time-delay networks 37*a* and 37*c*. These latter networks are proportioned to delay the pulse signals derived in the units 36*a* and 36*c***, respectively by 46° and 30°, for signals at the frequency of the subcarrier wave signal.

Adder circuit 28 is effectively a signal-combining device for combining the separately sampled signals and translating them as a single composite signal. Adder circuits such as are represented by the unit 28, are of conventional construction and may, for example, comprise a plurality of vacuum tubes having individual input circuits and common output circuits.

*Operation of color-signal modifying apparatus 15*

Before discussing in detail the operation of the system 15, it will be helpful to give some consideration to the problem which the system is intended to solve. As more fully explained in U.S. Patent No. 2,773,929, previously referred to herein, the signals developed in the transmitter of a system designed for constant luminance transmission are properly proportioned with respect to one another in order to take advantage, at the receiver, of the unequal sensitivity of the human eye to the brightness effects of the different primary colors, thereby to effect cancellation of any visual brightness effects contributed by the color signals. In a constant luminance transmission system it is desired that the modulated subcarrier wave signal and its modulation components should not affect the visual brightness of the image, but should contribute only chromaticity information. In one form of a receiver in a constant luminance system, as considered in the patent just referred to, the signals representative of the different primary colors are individually proportioned at the receiver in a manner complementary to the proportioning at the transmitter by translating the color signals through different channels individually having gains in inverse proportion to the brightness effects on the eye of the primary colors represented by the signals translated therethrough, thereby to effect cancellation in the reproduced image of any brightness effects which the color signals tend to produce. Other arrangements to effect the same result include cross-coupling circuits between the channels for mixing the different color signals, thereby effectively to control the gains thereof to effect the above-mentioned desired result. Specifically, one cross-coupling arrangement described in the aforementioned patent consists in deriving the color-signal components from the modulated subcarrier wave signal in such a manner as to effect the desired amount of gain control for the different color-signal components by utilizing the desired amount of cross-coupling of these signals. The last-mentioned arrangement has been designated as an asymmetrical sampling arrangement since the device for deriving the color-signal components, instead of deriving these components in a symmetrical manner from equally spaced phase points of the modulated subcarrier wave signal and with equal gains, is arranged to derive the components at unequally spaced phase points and with unequal gains.

A single-gun color tube conventionally includes an arrangement for symmetrically deriving the color signals in the form of narrow pulses and is designed directly to utilize the composite video-frequency signal to develop the color image therefrom. In other words, the derivation of the information from the composite video-frequency signal is accomplished within the envelope of the cathode-ray tube. It may be difficult to accomplish the above-described asymmetrical derivation in such a color tube due to the difficulty in separating the color and brightness information within the tube envelope. Therefore, if such a color tube is to be utilized in a constant luminance system, the composite video-frequency signal to be applied to the color tube should have such composition that the color signals may be derived symmetrically within the color tube and utilized to reproduce with desired fidelity the color image on the screen of the tube. The signal-translating system, in accordance with the present invention, develops such a composite video-frequency signal and utilizes circuits similar to those described in the aforementioned U.S. Patent No. 2,773,929 to effect the constant luminance correction at the receiver.

Considering now in detail the operation of the unit 15, a composite video-frequency signal is derived in the detector 14 and applied to the terminals 27, 27 of unit 15. As explained more fully in the above-mentioned U.S. Patent No. 2,773,929, such composite video-frequency signal includes a first or monochrome signal Y primarily representative of the visual brightness of a televised color image and which, for a given system, may be defined as follows:

$$Y=0.67G+0.30R+0.03B \qquad (1)$$

where G, R, and B represent, respectively, the green red, and blue color signals. The composite video-frequency signal also includes a second signal effectively including as modulation components signals $g_1$, $r_1$, and $b_1$, primarily representative of the chromaticity of the image where:

$$g_1=h(G-Y) \qquad (2)$$

$$r_1=\frac{R-Y}{n} \qquad (3)$$

$$b_1=\frac{B-Y}{p} \qquad (4)$$

The first or monochrome signal Y has a band width of substantially 0–4 megacycle, and the 3.58 megacycle subcarrier wave signal modulated by the 1.5 megacycle signals $g_1$, $r_1$, and $b_1$ has substantially a 2–4 megacycle band width and is interleaved in frequency with the signal Y in the common pass band. The coefficients $h$, $1/n$, and $1/p$ are the gain factors introduced at the transmitter for the signals $g_1$, $r_1$, and $b_1$, respectively, and, as described in the aforementioned patent, are related to the brightness effects produced by the selected primary colors green, red, and blue, respectively.

The composite video-frequency signal to be applied to the control electrode-cathode circuit of the cathode-ray tube in the apparatus 16, as considered more fully in the RCA Review article previously mentioned, should have a monochrome signal M defined as follows:

$$M=0.33G+0.33R+0.33B \qquad (5)$$

and a subcarrier wave signal effectively including as modulation components color-signal components $g_m$, $r_m$, $b_m$, defined as follows:

$$g_m=0.67G-0.33R-0.33R \qquad (6)$$
$$r_m=0.67R-0.33G-0.33B \qquad (7)$$
$$b_m=0.67B-0.33G-0.33R \qquad (8)$$

Thus in order to utilize the signals defined by Equations 1–4, inclusive, to reproduce a desirable image in a reproducing device which normally utilizes signals defined by Equations 5–8, inclusive, some modification of the first-mentioned signals should be effected. Additionally, if the constant luminance effects are to be obtained in the receiver, the signals defined by Equations 2–4, inclusive, at least effectively should individually be translated through channels having gains which are the reciprocals of the aforementioned gain factors $h$, $1/n$, and $1/p$.

Considering now the operation of the color-signal modifying apparatus 15, it should be understood that it is the purpose of this system to modify a composite video-frequency signal applied to the terminals 27, 27 and having components, as defined by Equations 1–4, inclusive, above, to a composite video-frequency signal in the output circuit of the adder circuit 28 substantially having components as defined by Equations 5–8, inclusive, above. Briefly, this modification of the composite video-frequency signal is effected by analyzing the latter signal in the manner in which it was intended to be analyzed in a constant luminance receiver and then recombining the components developed by such analysis into a composite video-frequency signal which retains the constant luminance characteristic of the original composite video-frequency signal and which is suitable for utilization in the image-reproducing apparatus 16. Thus, the signal $g_1$, defined by Equation 2 and which is is a modulation component of the subcarrier wave signal, is effectively translated through the network *35a* with other signals so as to have the gain factor of 2 cancelled therefrom. This is effected by causing the attenuation of the subcarrier wave signal to be substantially twice the attenuation of the other signals translated through the network *35a*. Similarly, the networks *35b* and *35c* correct for the gain factors present in the signals defined by Equations 3 and 4, respectively, above. Thus, the subcarrier wave signals supplied to the sampler circuits *36a–36c*, inclusive, are properly controlled in amplification to effect the constant luminance relationship considered above and in U.S. Patent No. 2,773,929.

The specific color-signal modifying apparatus 15 is designed to operate in a system wherein the modulation components, $g$, $r$, $b$, defined as follows:

$$g=0.33G-0.30R-0.03B \qquad (9)$$
$$r=0.70R-0.67G-0.03B \qquad (10)$$
$$b=0.97B-0.67G-0.30R \qquad (11)$$

occur respectively at the phase points of 14°, 180°, and 270°.

The foregoing signal values are determined by expanding Equations 2–4, inclusive, and substituting therein the value of Y as defined by Equation 1 and translating the resultant signals through channels having the aforementioned gain factors $h$, $1/n$, and $1/p$, respectively. Thus, the sampler circuits *36a–36c*, inclusive, under the control of the signals applied thereto from the generator 22 effectively translate therethrough, at the phase points of 14°, 180°, and 270°, respectively, of the subcarrier wave signal, narrow pulses of the signals applied to these sampler circuits from the units *35a*, *35b*, and *35c*, respectively. These narrow pulses have amplitudes proportional to the G, R, and B signals and include both the monochrome signal and the proper portions of the subcarrier wave signal but have time relationships representative of the phase relationships of 14°, 180°, and 270°. In order to utilize such signals in the image-reproducing apparatus 16, these pulses should be equally spaced in time equal to the time intervals of 120° phase points of a cycle of the subcarrier wave signal. Therefore, the signal translated through the time-delay network *37a* is delayed by 46° in phase at the frequency of the subcarrier wave signal and the signal translated through the network *37c* is delayed by 30° in phase at the same frequency. Consequently, the signals applied to the different input circuits of the adder circuit 28 have such relationships in time that they are effectively separated by 120° intervals of a cycle of the subcarrier wave signal. Therefore, the composite video-frequency signal developed in the adder circuit 28 by the combination of the three input signals is one in which the color signals occur at 120° intervals of the subcarrier wave signal. Consequently, such composite video-frequency signal may be applied through the terminals 27, 27 to an image-reproducing apparatus such as the unit 16 for utilization therein.

The manner of derivation of the color signals in the unit 16 is considered in detail in the RCA Review article previously referred to herein. Briefly, an electron beam is developed in the electron gun of the cathode-ray tube of the unit 16 and is directed toward the screen 25 through the apertures in the mask 26. This beam is effectively pulsed from a state of nonconduction to a state of conduction at a rate three times the frequency of the modulated subcarrier wave signal by the 10.7 megacycle signals applied to the cathode from the amplifier 39. The beam-rotating windings 18 have applied thereto a signal related in frequency to the subcarrier wave signal and developed in the generator 22. If the subcarrier wave signal has a frequency of 3.58 megacycles, the signal applied to the beam-rotating windings 18 also has a frequency of 3.58 megacycles and is effective in cooperation with the pulsing of the electron beam by the cathode to derive three color-signal pulses from each cycle of the 3.58 megacycle subcarrier wave signal at three phase points thereof. The signals developed in the windings 18 are effectively the sine and cosine signals of the 3.58 megacycle signal and cause the electron beam to rotate about the axis of its path of travel in a tight spiral. The deflection windings 17 affect the conventional line and field scanning of the screen 25 by the electron beam. The high-frequency spiraling of the electron beam as the beam is translated through each of the apertures in the mask 26 causes the electrons sequentially to impinge on the green, red, and blue color phosphor dots aligned with the aperture in the mask 26 through which the beam is passing. By properly adjusting the phase and synchronization of the signals applied to the windings 18 with a phase of the modulated subcarrier signal component of the signal applied to the input electrodes of the cathode-ray tube and the pulsing of the beam by the cathode, the beam is caused to fall upon the proper phospher dot at the time when the electron beam is translating a pulse of intensity information with respect to that color.

Although the present invention has been described with respect to asymmetrical sampling, it is to be understood that the same result may be achieved by locating time-delay networks **37*a* and 37*c* prior to sampler circuits 36*a* and 36*c*, respectively. Then, by merely supplying symmetrically phased reference signals to the sampler circuits the composite signal may then be symmetrically sampled and recombined in adder circuit 28. In this way the time delays of networks 37*a* and 37*c* may effectively be incorporated in filter networks 35*a* and 35*c***, respectively, to secure the most economical arrangement of the circuits.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Color-signal modifying apparatus comprising: means for supplying a color-television signal having modulation components asymmetrically disposed thereon; a plurality of signal-translating means coupled to said supply means having nonuniform amplitude response characteristics, each of said translating means including a sampling circuit, and at least one of said translating means having a predetermined phase shift, for developing from said supplied signal symmetrically phased signal components of a luminance-corrected symmetrical signal; and signal combining means coupled to the output of said translating means for combining said symmetrically phased components into a composite luminance-corrected signal.

2. Color-signal modifying apparatus comprising: means for supplying a color-television signal having modulation components asymmetrically disposed thereon; a plurality of signal-translating means coupled to said supply means including a corresponding number of filter networks having frequency-dependent amplitude response characteristics, each of said channels including a sampling circuit, and at least one of said translating means having a predetermined phase shift, for developing from said supplied signal symmetrically phased signal components of a luminance-corrected symmetrical signal; and signal combining means coupled to the output of said translating means for combining said symmetrically phased luminance-corrected components into a composite luminance-corrected signal.

3. Color-signal modifying apparatus comprising: means for supplying a color-television signal having modulation components asymmetrically disposed thereon; a plurality of signal-translating means coupled to said supply means having nonuniform amplitude response characteristics, each of said translating means including a sampling circuit, and at least one of said translating means having coupled to the output of the respective sampling circuit a network having a predetermined phase shift, for developing from said supplied signal symmetrically phased signal components of a luminance-corrected symmetrical signal; and signal combining means coupled to the output of said translating means for combining said symmetrically phased luminance-corrected components into a composite luminance-corrected signal.

4. Color-signal modifying apparatus comprising: means for supplying a color-television signal having modulation components asymmetrically disposed thereon; a plurality of signal-translating means coupled to said supply means having nonuniform amplitude response characteristics, each of said translating means including a sampling circuit, and at least one of said translating means having a predetermined phase shift, for developing from said supplied signal symmetrically phased signal components of a luminance-corrected symmetrical signal; and signal combining means including an adder circuit coupled to the output of said translating means for combining said symmetrically phased luminance-corrected components into a composite luminance-corrected signal.

No references cited.